United States Patent
Wu

(10) Patent No.: US 10,218,201 B2
(45) Date of Patent: Feb. 26, 2019

(54) CHARGE AND DISCHARGE CONTROL APPARATUS AND METHOD

(71) Applicant: Institute For Information Industry, Taipei (TW)

(72) Inventor: Jui-Ming Wu, New Taipei (TW)

(73) Assignee: Institute For Information Industry, Taipei (TW)

( * ) Notice: Subject to any disclaimer, the term of this patent is extended or adjusted under 35 U.S.C. 154(b) by 57 days.

(21) Appl. No.: 15/337,101

(22) Filed: Oct. 28, 2016

(65) Prior Publication Data

US 2018/0090943 A1 Mar. 29, 2018

(30) Foreign Application Priority Data

Sep. 26, 2016 (TW) .............................. 105131012 A

(51) Int. Cl.
*G05F 1/66* (2006.01)
*H02J 7/00* (2006.01)

(52) U.S. Cl.
CPC ................ *H02J 7/007* (2013.01); *G05F 1/66* (2013.01); *H02J 7/0029* (2013.01); *H02J 2007/004* (2013.01); *H02J 2007/0096* (2013.01)

(58) Field of Classification Search
CPC ............ H02J 7/007; H02J 7/0029; G05F 1/66
USPC ........................................................ 320/134
See application file for complete search history.

(56) References Cited

U.S. PATENT DOCUMENTS

| 9,440,541 | B2 * | 9/2016 | Sakai | B60L 11/1818 |
|---|---|---|---|---|
| 9,660,450 | B2 * | 5/2017 | Li | H02J 3/32 |
| 9,860,415 | B2 * | 1/2018 | Zeng | H04N 1/32277 |
| 2016/0036247 | A1 | 2/2016 | Park et al. | |

OTHER PUBLICATIONS

A. Nottrott, J. Kleissl, B. Washom, Energy dispatch schedule optimization and cost benefit analysis for grid-connected, photovoltaic-battery storage systems. Renewable Energy 55 (2013), 230-240, Jan. 24, 2013, 11 pages.

* cited by examiner

Primary Examiner — M Baye Diao
(74) Attorney, Agent, or Firm — Skaar Ulbrich Macari, P.A.

(57) ABSTRACT

The charge and discharge control apparatus divides a stored electricity amount of a storage battery into a backup electricity amount and a plurality of predetermined discharge amount corresponding to a plurality of dispatching time points. Each of the dispatching time points corresponds to a dispatching period and a predetermined discharge power. The charge and discharge control apparatus receives a load parameter of an electric loop at each dispatching time point. Each load parameter carries a load power of the electric loop. The charge and discharge control apparatus performs the following operations at each dispatching time point: (i) deciding a real discharge power that the storage battery provides to the electric loop according to a dispatching threshold and the load power corresponding to the dispatching time point and (ii) updating the backup electricity amount according to the real discharge power and the predetermined discharge amount.

20 Claims, 10 Drawing Sheets

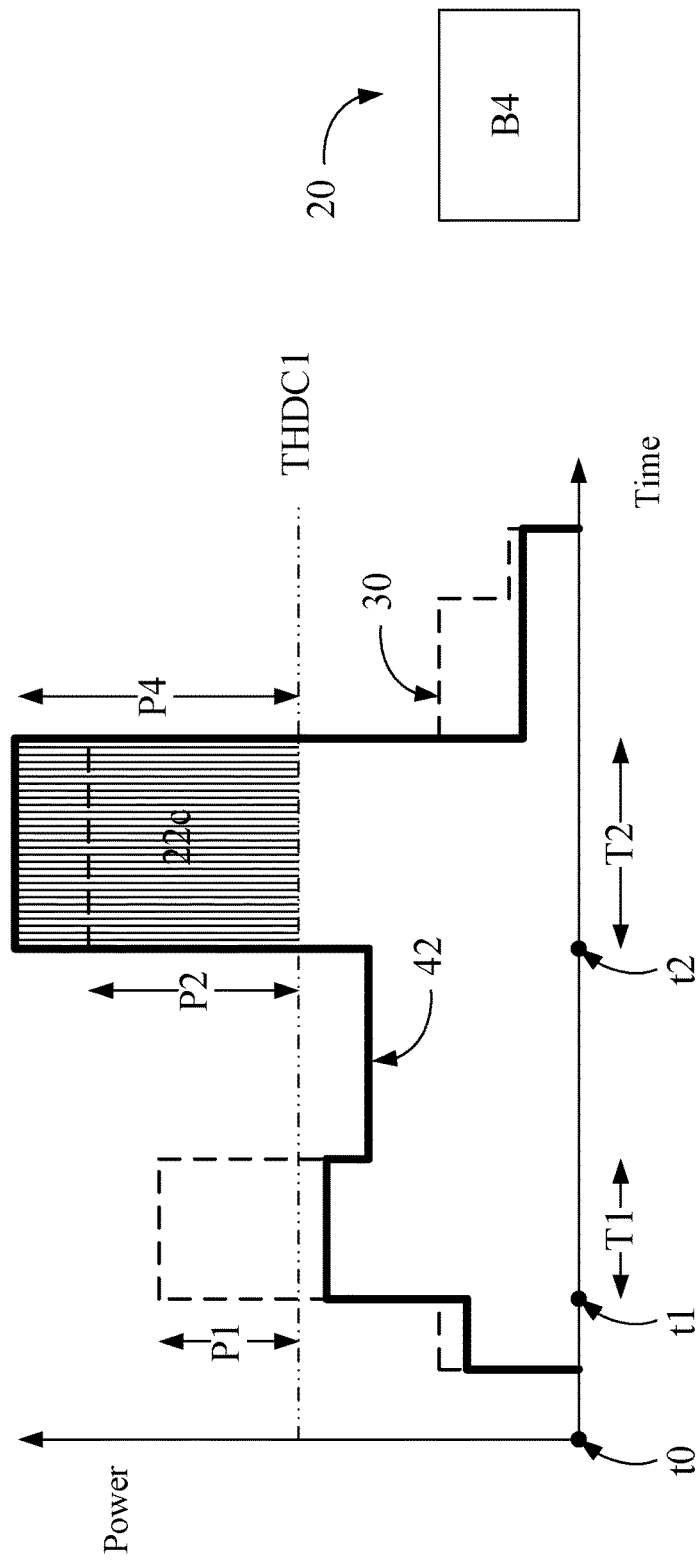

CHARGE AND DISCHARGE CONTROL APPARATUS AND METHOD

PRIORITY

This application claims priority to Taiwan Patent Application No. 105131012 filed on Sep. 26, 2016, which is hereby incorporated by reference herein in its entirety.

FIELD

The present invention relates to a charge and discharge control apparatus and method. More particularly, the present invention relates to a charge and discharge control apparatus and method for a battery energy storage system (BESS).

BACKGROUND

Electricity charges collected by electric power companies from users are generally divided into two categories, the energy charge and the demand charge. The energy charge is the charge of the total electricity consumed by the user during a certain period of time (e.g., during a billing month), wherein the unit of the energy is charged by kWh (kilowatt-hour). With respect to the energy charge, the electric power companies usually implement time-dependent electricity prices (i.e. setting different electricity price rates for different periods) and, thereby, guiding the users to reduce the electricity consumption during the peak period. As to the demand charge, it is the charge collected by the electric power company according to a maximum demand of the user during a certain period of time (e.g., during a billing month), wherein the unit of the demand is charged by kW. Different electric company calculates "demand" in different ways and, generally, the demand is calculated according to the average electricity consumption power during a certain period of time (e.g., 15 minutes, or longer or shorter than 15 minutes). The electric power company collects a fixed demand charge according to a contracted capacity signed with the user in advance. The electric power company will collect an additional charge if the maximum demand of the real power consumption of the user exceeds the contracted capacity. By setting the contracted capacity and collecting the demand charge, the electric power company can more easily control the peak load of the overall electric power system.

To reduce the energy charge and the demand charge, many users utilize storage batteries in order to reduce the peak electricity consumption of the power supply system of the electric power company, maintain a stable electricity consumption power, and reduce the maximum demand. Generally speaking, the user may charge the storage batteries during the off-peak electricity price period where the electricity price rate is relatively low (or during the off-peak power consumption period where the power consumption is relatively low) and discharge the storage batteries during the peak electricity price period where the electricity price rate is relatively high (or during the peak power consumption period where the power consumption is relatively high). By controlling the charge and discharge of the storage battery, load shifting and peak load shaving can be achieved and, thereby, reducing the energy charge and the demand charge.

Currently, technologies that use storage batteries for peak load shaving can be classified into three categories. Technologies of the first category charge and discharge the storage batteries at fixed times without considering the variation of the real load of the users. Technologies of the second category discharge the storage batteries when the real load of the user is greater than a threshold or discharge the storage batteries when the electricity price rate exceeds a threshold. Technologies of the third category predict a load curve in advance and then decide the charge and discharge of the storage battery according to the predicted load curve. Technologies of the aforesaid first and second categories do not consider the time at which the maximum load actually occurs, while technologies of the third category cannot deal with the situation that the real load is different from the predicted load. Therefore, the conventional technologies for peak load shaving by using the storage battery still need to be improved.

Accordingly, there is still an urgent need for a charge and discharge control technology which can shave the peak load by the storage battery efficiently and, thereby, reducing the demand charge and the energy charge of the user and reducing the overall peak load of the power supply system of the electric power company.

SUMMARY

The disclosure includes a charge and discharge control apparatus. The charge and discharge control apparatus in one example comprises a first communication interface, a processing unit, and a second communication interface, wherein the processing unit is electrically connected to the first communication interface and the second communication interface. The first communication interface is configured to receive a stored electricity parameter of a storage battery, wherein the stored electricity parameter carries a stored electricity amount of the storage battery. The processing unit is configured to divide the stored electricity amount into a backup electricity amount and a plurality of predetermined discharge amount corresponding to a plurality of dispatching time points, wherein each of the dispatching time points corresponds to a dispatching period and a predetermined discharge power. The second communication interface is electrically connected to an electric loop and is configured to receive a load parameter of the electric loop at each of the dispatching time points, wherein each of the load parameters carries a load power of the electric loop. The processing unit further performs the following operations at each of the dispatching time points: (i) deciding a real discharge power that the storage battery provides to the electric loop according to a dispatching threshold and the load power corresponding to the dispatching time point and (ii) updating the backup electricity amount according to the real discharge power and the predetermined discharge amount.

The disclosure also includes a charge and discharge control method for an electronic computing apparatus. The electronic computing apparatus is adapted to control a storage battery and connected to an electric loop. The charge and discharge control method in one example comprises the following steps: (a) receiving a stored electricity parameter of a storage battery, wherein the stored electricity parameter carries a stored electricity amount of the storage battery, (b) dividing the stored electricity amount into a backup electricity amount and a plurality of predetermined discharge amount corresponding to a plurality of dispatching time points, wherein each of the dispatching time points corresponds to a dispatching period and a predetermined discharge power, (c) receiving a load parameter of the electric loop at each of the dispatching time points, wherein each of the load parameters carries a load power of the electric loop, and (d) executing the following steps at each of the dispatching time points: (d1) deciding a real discharge power that the storage battery provides to the electric loop according to a dispatching threshold and the load power corresponding to the dispatching time point and (d2) updating the backup electricity amount according to the real discharge power and the predetermined discharge amount.

The charge and discharge control technology provided in the present invention can control a storage battery to be charged by a power supply system of an electric power company during a period that the electricity price is relatively low (e.g., during the off-peak electricity price period). In addition, the charge and discharge control technology provided in the present invention can control the storage battery to release electricity to an electric loop at appropriate time during the real electricity dispatching period. Before the real electricity dispatching period, the charge and discharge control technology of the present invention divides the stored electricity amount of the storage battery into a backup electricity amount and a plurality of predetermined discharge amount corresponding to a plurality of dispatching time points. During the real electricity dispatching period, the present invention decides a real discharge power that the storage battery provides to the electric loop according to a dispatching threshold and the real load power of the electric loop and updates the backup electricity amount according to the real discharge power and the predetermined discharge amount. Since the charge and discharge control technology of the present invention adjusts the real discharge power that the storage battery provides to the electric loop according to the real load power of the electric loop during the real electricity dispatching period, the electricity consumption peak during the real electricity dispatching period can be shaved accurately and, thereby, reducing the demand charge. Moreover, the charge and discharge control technology of the present invention enables a storage battery to be charged during the period that the electricity price is relatively low and enables the storage battery to discharge during the period that the electricity price is relatively high. In this way, a higher economic benefit is achieved because of the difference of the electricity prices between the peak period and the off-peak period.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1B is a schematic view depicting the charge and discharge control apparatus 11 deciding the predetermined discharge amounts 21a and 22a according to a load prediction curve 30;

FIG. 1C is a schematic view depicting a stored electricity amount 20 being divided into a backup electricity amount B1 and the predetermined discharge amounts 21a and 22a;

FIG. 1I is another schematic view depicting how the charge and discharge control apparatus 11 decides the electricity to be released by the storage battery 15;

FIG. 1J is a schematic view depicting an updated backup electricity amount B4;

DETAILED DESCRIPTION

In the following description, a charge and discharge control apparatus and method provided in the present invention will be explained with reference to certain example embodiments thereof. However, these example embodiments are not intended to limit the present invention to any specific examples, embodiments, environment, applications, or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction. In addition, dimensions of elements and dimensional relationships among individual elements in the attached drawings are only for the purpose of illustration, but not to limit the scope of the present invention.

Figure 1A:
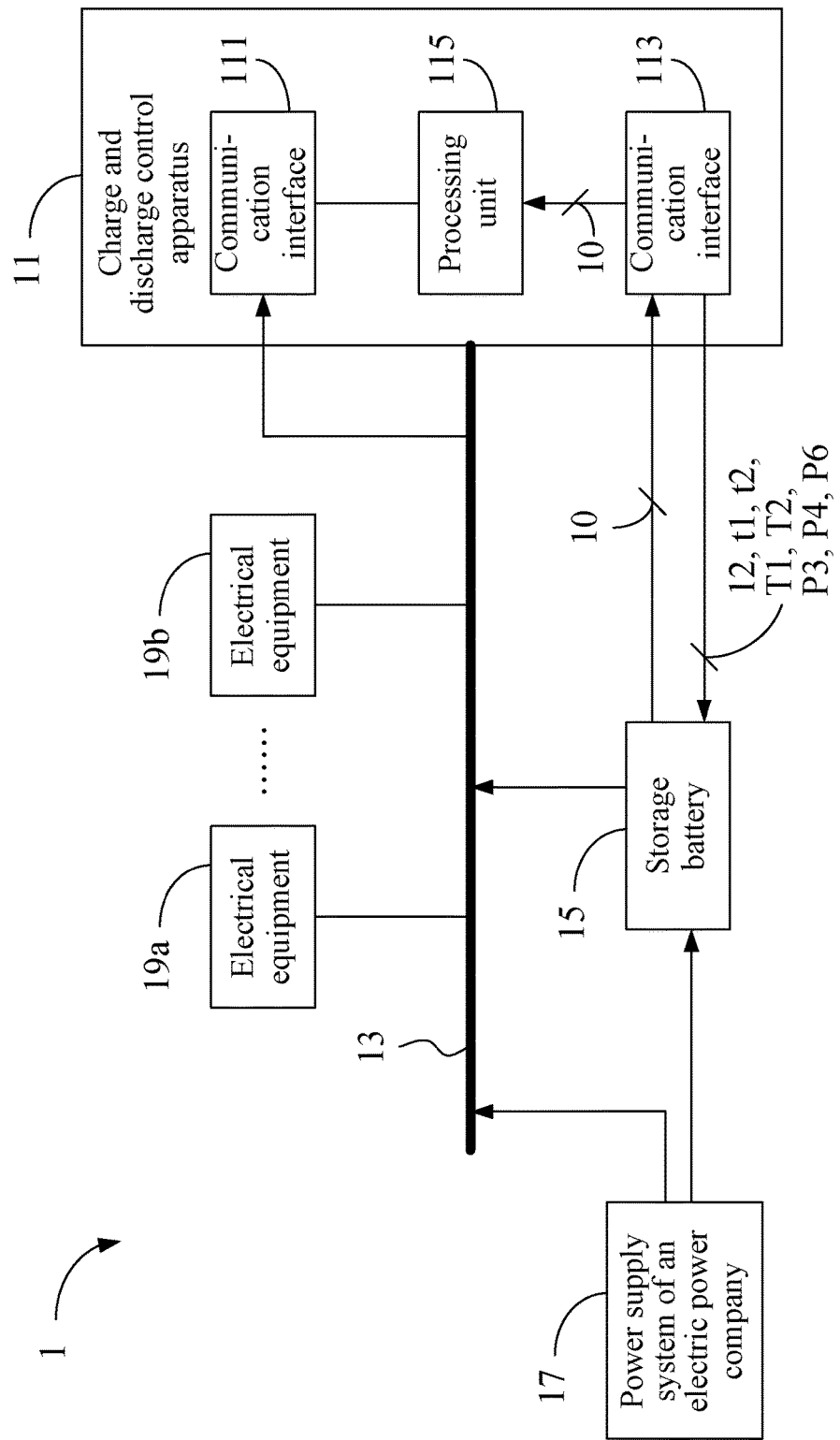
FIG. 1A is a schematic view depicting the architecture of a first embodiment of the present invention.

A first embodiment of the present invention is a power consumption system 1 and a schematic view of which is depicted in FIG. 1A. The power consumption system 1 comprises a charge and discharge control apparatus 11, an electric loop 13, a storage battery 15, a power supply system 17 of an electric power company, and a plurality of electrical equipments 19a, . . . , 19b. Both the storage battery 15 and the power supply system 17 of the electric power company are connected to the electric loop 13 and both of them can provide electricity to the electric loop 13. The electrical equipments 19a, . . . , 19b may be connected to the electric loop 13 to obtain electricity. It shall be appreciated that the number of electrical equipments connected to the electric loop 13 is not limited in this embodiment. Moreover, the number of electrical equipments connected to the electric loop 13 may vary depending on different time points. Although FIG. 1A depicts that the electrical equipments 19a, . . . , 19b are connected to the electric loop 13, this is only an example showing the operation at a certain time point. Additionally, the storage battery 15 is connected to the power supply system 17 of the electric power company, so the storage battery 15 can be charged by the power supply system 17 of the electric power company during a specific period under the control of the charge and discharge control apparatus 11.

The core of this embodiment is the charge and discharge control apparatus 11. The charge and discharge control apparatus 11 comprises two communication interfaces 111 and 113 and a processing unit 115. The processing unit 115 is electrically connected to the communication interfaces 111 and 113, while the communication interfaces 111 and 113 are electrically connected to the electric loop 13 and the storage battery 15 respectively. The charge and discharge control apparatus 11 may be any of various apparatuses capable of electronic computation (e.g., various computers). The processing unit 115 may be any of central processing units (CPUs), microprocessors, or other computing devices known to those of ordinary skill in the art. The communication interface 111 may be any interface that capable of receiving information from the electric loop 13 (e.g., a communication interface that receives information about the power consumption related load parameter from a power consumption measuring apparatus (not shown) on the electric loop 13), and the communication interface 113 may be any interface that capable of exchanging information with the storage battery 15.

Generally speaking, the charge and discharge control apparatus 11 may control the storage battery 15 to be charged by the power supply system 17 of the electric power company during a first specific period (e.g., an off-peak electricity price period). Moreover, the charge and discharge control apparatus 11 decides a real discharge power that the storage battery 15 provides to the electric loop 13 during a second specific period (e.g., a peak electricity price period) at least according to the load power of the electric loop 13. In different embodiments, the aforesaid load power may be an average consumption power during a certain period of time (e.g., 15 minutes, or longer or shorter than 15 minutes) or an instant consumption power. The operations performed by the charge and discharge control apparatus 11 will be described in detail hereinafter.

Before the real electricity dispatching period, the communication interface 113 of the charge and discharge control apparatus 11 may transmit an instruction signal 12 to the storage battery 15 during an off-peak electricity price period. In response to receiving the instruction signal 12, the storage battery 15 switches to the charge mode to be charged by the power supply system 17 of the electric power company. Thereafter, the communication interface 113 of the charge and discharge control apparatus 11 receives a stored electricity parameter 10 of the storage battery 15, wherein the stored electricity parameter 10 carries a current stored electricity amount (in unit of kWh) of the storage battery 15. For example, if the storage battery 15 is just fully charged, the stored electricity amount carried by the stored electricity parameter 10 is the maximum stored electricity amount of the storage battery 15. After the communication interface 113 receives the stored electricity parameter 10, the processing unit 115 divides the current stored electricity amount of the storage battery 15 into a backup electricity amount and a plurality of predetermined discharge amounts corresponding to a plurality of dispatching time points, wherein each of the aforesaid dispatching time points corresponds to a dispatching period and a predetermined discharge power (in unit of kW). The aforesaid arrangement means that for the dispatching period corresponding to each of the dispatching time points, the charge and discharge control apparatus 11 prearranges the storage battery 15 to release electricity at a predetermined discharge power and the expected total released electricity during the dispatching period is the predetermined discharge amount. Moreover, the charge and discharge control apparatus 11 retains the backup electricity amount in advance just in case. Please note that the aforesaid arrangement is made before the real electricity dispatching period and is only used as a reference for the subsequent real electricity dispatching period.

Figures 1B, 1C:
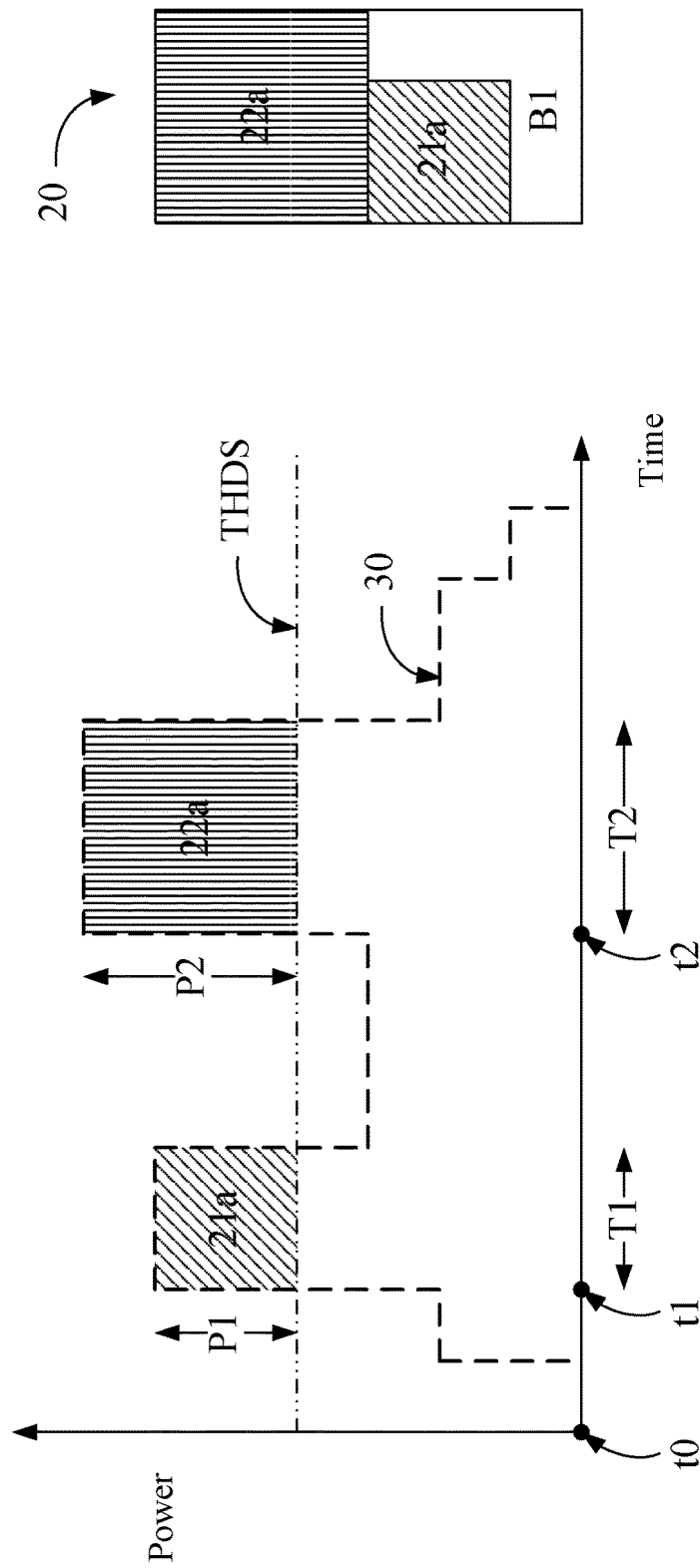

For ease of understanding, please refer to the specific examples depicted in FIG. 1B and FIG. 1C. FIG. 1B is a schematic view depicting a load prediction curve 30 and the predetermined discharge amounts 21a and 22a decided by the charge and discharge control apparatus 11 according to the load prediction curve 30, wherein the horizontal axis represents the time and the vertical axis represents the power. In this specific example, the real electricity dispatching period starts at a dispatching time point W. FIG. 1C is a schematic view depicting the stored electricity amount 20 of the storage battery 15 being divided into a backup electricity amount B1 and the predetermined discharge amounts 21a and 22a. In this specific exemplary example, a dispatching time point t1 corresponds to a dispatching period T1 (e.g., the dispatching period T1 starts at the dispatching time point t1) and a predetermined discharge power P1. If the storage battery 15 releases electricity at the predetermined discharge power P1 during the dispatching period T1, the electricity discharged by the storage battery 15 during the dispatching period T1 will be the predetermined discharge amount 21a. Furthermore, a dispatching time point t2 corresponds to a dispatching period T2 (e.g., the dispatching period T2 starts at the dispatching time point t2) and a predetermined discharge power P2. If the storage battery 15 releases electricity at the predetermined discharge power P2 during the dispatching period T2, the electricity discharged by the storage battery 15 during the dispatching period T2 will be the predetermined discharge amount 22a. Based on the aforesaid analysis, the processing unit 115 divides the stored electricity amount 20 of the storage battery 15 into the backup electricity amount B1, the predetermined discharge amount 21a corresponding to the dispatching time point t1, and the predetermined discharge amount 22a corresponding to the dispatching time point t2 before the real electricity dispatching period.

The details regarding how the charge and discharge control apparatus 11 prearranges the storage battery 15 to release electricity at how much predetermined discharge power within the dispatching period corresponding to which dispatching time points will be describe herein.

In some embodiments, the processing unit 115 of the charge and discharge control apparatus 11 may arbitrarily prearrange the predetermined discharge power and the dispatching periods for releasing electricity, as long as the predetermined discharge power is not greater than the maximum discharge power of the storage battery 15 and the accumulated predetermined discharge amount is not greater than the stored electricity amount of the storage battery 15.

In some embodiments, the processing unit 115 of the charge and discharge control apparatus 11 may refer to a load prediction curve (e.g., the load prediction curve 30 depicted in FIG. 1B) when prearranging the storage batter 15 to release electricity at how much predetermined discharge power within the dispatching periods defined by the dispatching time points, wherein the aforesaid load prediction curve carries a predicted load power at each of the dispatching time points. The load prediction curve may be decided by the processing unit 115 of the charge and discharge control apparatus 11 or other electronic computing apparatuses according to historical load data of the electric loop 13. It shall be appreciated that how to decide the load prediction curve for a future period according to the historical load data of the electric loop shall be readily appreciated by those of ordinary skill in the art. How to decide the load prediction curve according to the historical load data is not the focus of the present invention and, hence, the details thereof will not be described herein.

The processing unit 115 may firstly prearrange the storage battery 15 to release electricity within the period corresponding to the higher predicted load power in order to shave the power consumption peak of the electric loop 13. Moreover, the processing unit 115 may decide the plurality of predetermined discharge power according to the plurality of predicted load power and a schedule threshold (e.g., a schedule threshold THDS depicted in FIG. 1B). Taking FIG. 1B as an example, the dispatching period T1 corresponding to the dispatching time point t1 and the dispatching period T2 corresponding to the dispatching time point t2 are the two periods with higher predicted load power. The predetermined discharge power P1 corresponding to the dispatching time point t1 is the predicted load power corresponding to the dispatching time point t1 minus the schedule threshold THDS, while the predetermined discharge power P2 corresponding to the dispatching time point t2 is the predicted load power corresponding to the dispatching time point t2 minus the schedule threshold THDS.

It shall be appreciated that, in some embodiments, the processing unit 115 of the charge and discharge control apparatus 11 may set the aforesaid schedule threshold arbitrarily. In some embodiments, the processing unit 115 of the charge and discharge control apparatus 11 may calculate the aforesaid schedule threshold according to predicted load data. Specifically, the processing unit 115 calculates a peak shaving limit that satisfies the following two conditions: (a) each of the predicted load power minus the peak shaving limit is not greater than a maximum discharge power of the storage battery 15 (because the value obtained by subtracting the peak shaving limit from each of the predicted load power is the power that the charge and discharge control apparatus 11 is considering to prearrange for the storage battery 15 to releases electricity, it cannot be greater than the maximum discharge power of the storage battery 15) and (b) an evaluated discharge amount decided according to the peak shaving limit and the plurality of predicted load power is not greater than the stored electricity amount. The processing unit 115 then selects the greatest one of the peak shaving limit, a contracted capacity signed by the user of the electric loop 13 with the electric power company, and a maximum demand of a past specific period (e.g., this billing month) as the schedule threshold. In some embodiments, the processing unit 115 may select one of the three items (i.e. the peak shaving limit, a contracted capacity signed by the user of the electric loop 13 with the electric power company, and a maximum demand of a past specific period) or the greatest one of some of the three items as the schedule threshold.

Figures 1D, 1E:
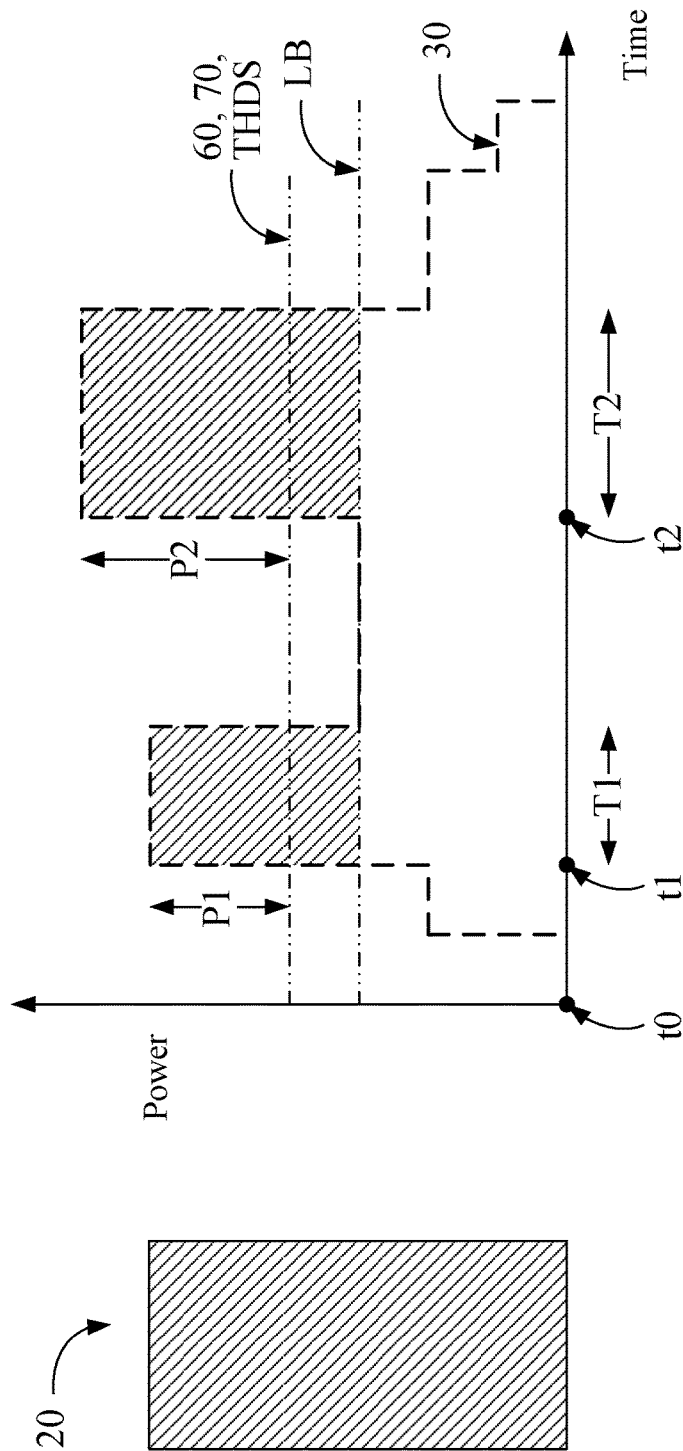
FIG. 1D is a schematic view depicting the stored electricity amount 20 of a storage battery 15.
FIG. 1E is a schematic view depicting how the charge and discharge control apparatus 11 decides a peak shaving limit LB and a schedule threshold THDS.

For ease of understanding, please refer to the concrete examples depicted in FIG. 1D and FIG. 1E. FIG. 1D is a schematic view depicting the stored electricity amount 20 of the storage battery 15. FIG. 1E is a schematic view depicting how the processing unit 115 of the charge and discharge control apparatus 11 decides the peak shaving limit LB and the schedule threshold THDS, wherein the horizontal axis represents the time and the vertical axis represents the load power. The processing unit 115 decides the peak shaving limit LB by evaluating the maximum extent to which the peak of the load prediction curve 30 can be shaved by the stored electricity amount 20. To present the peak shaving limit LB visually, the processing unit 115 fills the regions below the load prediction curve 30 (i.e., the blocks with oblique lines) of FIG. 1E with the stored electricity amount 20 depicted in FIG. 1D in a way that satisfies the following two conditions: (a) each of the predicted load power minus the peak shaving limit is not greater than a maximum discharge power of the storage battery 15 and (b) an evaluated discharge amount decided according to the peak shaving limit and the predicted load power is not greater than the stored electricity amount (i.e., the area filled into the regions below the load prediction curve 30 of FIG. 1E cannot be greater than the area of the stored electricity amount 20 depicted in FIG. 1D). In this concrete example, the processing unit 115 decides the peak shaving limit LB according to the aforesaid standards. Then, the processing unit 115 selects the greatest one of the peak shaving limit 30, a demand charge 60 signed by the user of the electric loop 13 with the electric power company, and a maximum demand 70 of a past specific period (e.g., this billing month) as the schedule threshold THDS.

It shall be appreciated that taking the peak shaving limit LB as the schedule threshold THDS when the peak shaving limit LB is the largest one of the aforesaid three items has some meaning. That is, although the peak of the load prediction curve 30 cannot be completely shaved below the contracted capacity and the maximum demand, the processing unit 115 has prearranged the storage battery 15 to release electricity at its maximum capability. When the peak shaving limit LB is taken as the schedule threshold THDS, the value of the backup electricity amount will be zero. It shall be appreciated that taking the contracted capacity 60 as the schedule threshold THDS when the contracted capacity 60 is the largest one of the aforesaid three items has some meaning as well. That is, the electricity released by the storage battery 15 under the control of the processing unit 115 will shave the peak of the load prediction curve 30 to below the schedule threshold THDS, and the backup electricity amount may not be zero afterwards. Similarly, taking the maximum demand 70 of a specific period as the schedule threshold THDS when the maximum demand 70 is the greatest one of the aforesaid three items has some meaning. That is, the electricity released by the storage battery 15 under the control of the processing unit 115 will shave the peak of the load prediction curve 30 to below the schedule threshold THDS, and the backup electricity amount may not be zero afterwards.

The operations performed by the charge and discharge control apparatus 11 during the real electricity dispatching period will be described hereinafter. The communication interface 111 receives a load parameter of the electric loop 13 at each of the dispatching time points, wherein each of the load parameters carries a load power of the electric loop 13. The processing unit 115 performs the following operations at each of the dispatching time points: (a) deciding a real discharge power that the storage battery 15 provides to the electric loop 13 according to a dispatching threshold (which will be detailed later) and the load power corresponding to the dispatching time point and (b) updating the backup electricity amount according to the real discharge power and the predetermined discharge amount. It shall be appreciated that the processing unit 115 may decide the dispatching threshold according to the schedule threshold THDS and a maximum demand 70 of a past specific period (e.g., this billing month). In some embodiments, the processing unit 115 may decide the dispatching threshold according to the contracted capacity 60 signed by the user of the electric loop 13 with the electric power company and the maximum demand 70 of a past specific period (e.g., this billing month). During the real electricity dispatching period, four kinds of situations may occur. In the following descriptions, how the charge and discharge control apparatus 11 performs the aforesaid operations (a) and (b) with respect to the four kinds of situations will be elaborated.

Figure 1F:
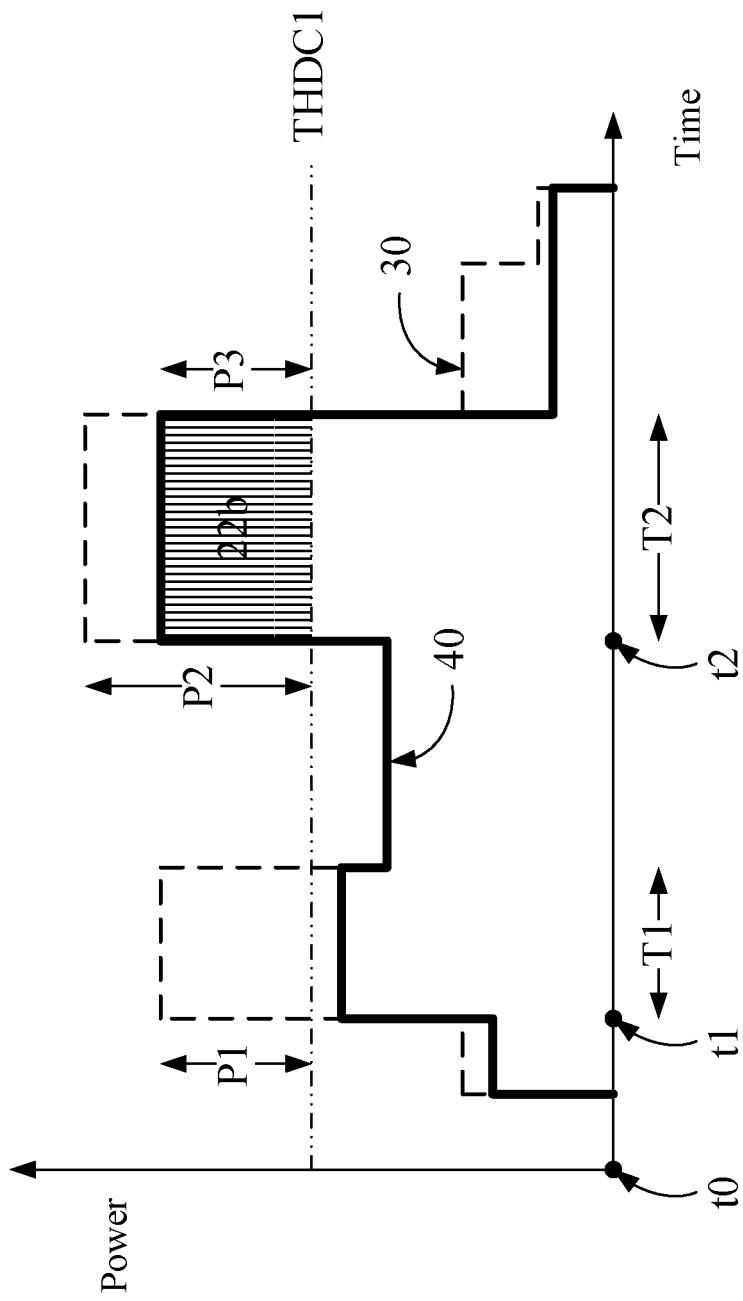
FIG. 1F is a schematic view depicting how the charge and discharge control apparatus 11 decides the electricity to be released by the storage battery 15.
Figure 1H:
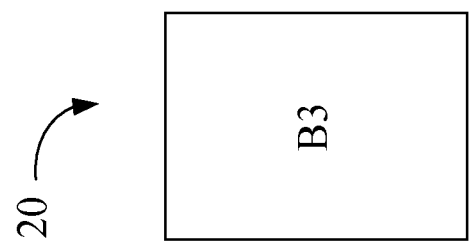
FIG. 1H is a schematic view depicting an updated backup electricity amount B3.
Figure 1G:
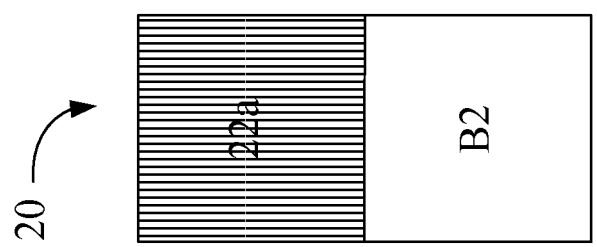
FIG. 1G is a schematic view depicting an updated backup electricity amount B2.

Please refer to FIG. 1B, FIG. 1C, FIG. 1F, and FIG. 1G for the first kind of situation. FIG. 1F illustrates how the processing unit 115 of the charge and discharge control apparatus 11 decides, under the prearrangement (as shown in FIG. 1B and FIG. 1C), the electricity to be released by the storage battery 15 according to the load power of the electric loop 13 during the real electricity dispatching period, wherein the horizontal axis represents the time and the vertical axis represents the load power. In FIG. 1F, a real load curve 40 represents the real load power of the electric loop 13 at each of the dispatching time points. The communication interface 111 receives a load parameter of the electric loop 13 at the dispatching time point t1, wherein the load parameter carries a load power of the electric loop 13 at the dispatching time point t1. Next, the processing unit 115 determines that the load power corresponding to the dispatching time point t1 (which may be called a first specific time point so as to be distinguished from other dispatching time points) is smaller than a dispatching threshold THDC1. It shall be appreciated that the processing unit 115 may set the dispatching threshold THDC1 to be the same as the aforesaid schedule threshold THDS at the beginning of the real electricity dispatching period. In some embodiments, the greatest one of the contracted capacity 60 and the maximum demand 70 of a past specific period (e.g., this billing month) may also be served as the dispatching threshold THDC1. Since the load power corresponding to the dispatching time point t1 (i.e., the first specific time point) is smaller than the dispatching threshold THDC1, the processing unit 115 decides the real discharge power that the storage battery 15 provides to the electric loop 13 at the dispatching time point t1 (i.e., the first specific time point) to be zero and decides the real discharge power that the storage battery 15 provides to the electric loop 13 during the dispatching period T1 corresponding to the dispatching time point t1 (i.e., the first specific time point) to be zero. Moreover, the processing unit 115 obtains an updated backup electricity amount B2 by adding the predetermined discharge amount 21a corresponding to the dispatching time point t1 (i.e., the first specific time point) to the backup electricity amount B1 as shown in FIG. 1G.

Please refer to FIG. 1B, FIG. 1C, FIG. 1F, FIG. 1G, and FIG. 1H for the second kind of situation. The communication interface 111 receives a load parameter of the electric loop 13 at the dispatching time point t2, wherein the load parameter carries a load power of the electric loop 13 at the dispatching time point t2. Next, the processing unit 115 determines that the load power corresponding to the dispatching time point t2 (which may be called a second specific time point so as to be distinguished from other dispatching time points) is greater than the dispatching threshold THDC1 and smaller than a sum of the predetermined discharge power P2 corresponding to the dispatching time point t2 and the dispatching threshold THDC1. Based on the aforesaid determination result, the processing unit 115 decides a real discharge power P3 that the storage battery 15 provides to the electric loop 13 at the dispatching time point t2 (i.e., the second specific time point) and the dispatching period T2 corresponding to the dispatching time point t2 to be the load power corresponding to the dispatching time point t2 (i.e., the second specific time point) minus the dispatching threshold THDC1. Additionally, the processing unit 115 decides a real discharge amount 22b according to the real discharge power P3 at the dispatching time point t2 (i.e., the second specific time point) and the dispatching period T2 corresponding to the dispatching time point t2 (i.e., the second specific time point) as shown in FIG. 1F. Moreover, the processing unit 115 obtains an updated backup electricity amount B3 by adding a difference between the predetermined discharge amount 22a corresponding to the dispatching time point t2 (i.e., the second specific time point) and the real discharge amount 22b to the backup electricity amount B2 as shown in FIG. 1H.

Please refer to FIG. 1B, FIG. 1C, FIG. 1F, FIG. 1G, FIG. 1I, and FIG. 1J for the third kind of situation. FIG. 1I illustrates how the processing unit 115 of the charge and discharge control apparatus 11 decides the electricity to be released by the storage battery 15 according to the load power of the electric loop 13 during the real electricity dispatching period, wherein the horizontal axis represents the time and the vertical axis represents the load power. In FIG. 1I, a real load curve 42 represents the real load power of the electric loop 13 at each of the dispatching time points. The difference between the real load curve 42 and the real load curve 40 depicted in FIG. 1F is the portion after the dispatching time point t2. The communication interface 111 receives a load parameter of the electric loop 13 at the dispatching time point t2, wherein the load parameter carries a load power of the electric loop 13 at the dispatching time point t2. It is assumed that the load power of the electric loop 13 at the dispatching time point t2 is as shown in FIG. 1I. Next, the processing unit 115 determines that the load power corresponding to the dispatching time point t2 (which may be called a third specific time point so as to be distinguished from other dispatching time points) is greater than the dispatching threshold THDC1 and greater than a sum of the predetermined discharge power P2 corresponding to the dispatching time point t2 (i.e., the third specific time point) and the dispatching threshold THDC1. Based on the aforesaid determination result, the processing unit 115 takes the load power corresponding to the dispatching time point t2 (i.e., the third specific time point) minus the dispatching threshold THDC1 as an evaluated discharge power P4 and calculates an evaluated discharge amount 22c according to the evaluated discharge power P4 and the dispatching period T2 corresponding to the dispatching time point t2 (i.e., the third specific time point) as shown in FIG. H. In the third kind of situation, the processing unit 115 determines that the evaluated discharge amount 22c is smaller than a sum of the current backup electricity amount B2 and the predetermined discharge amount 22a corresponding to the dispatching time point t2 (i.e., the third specific time point) (see FIG. 1G), so the processing unit 115 decides the real discharge power of the dispatching time point t2 (i.e., the third specific time point) and the dispatching period T2 corresponding to the dispatching time point t2 (i.e., the third specific time point) to be the evaluated discharge power P4. Moreover, the processing unit 115 obtains an updated backup electricity amount B4 by subtracting a difference between the evaluated discharge amount 22c and the predetermined discharge amount 22a corresponding to the dispatching time point t2 (i.e., the third specific time point) from the backup electricity amount B2 as shown in FIG. 1J.

Figure 1K:
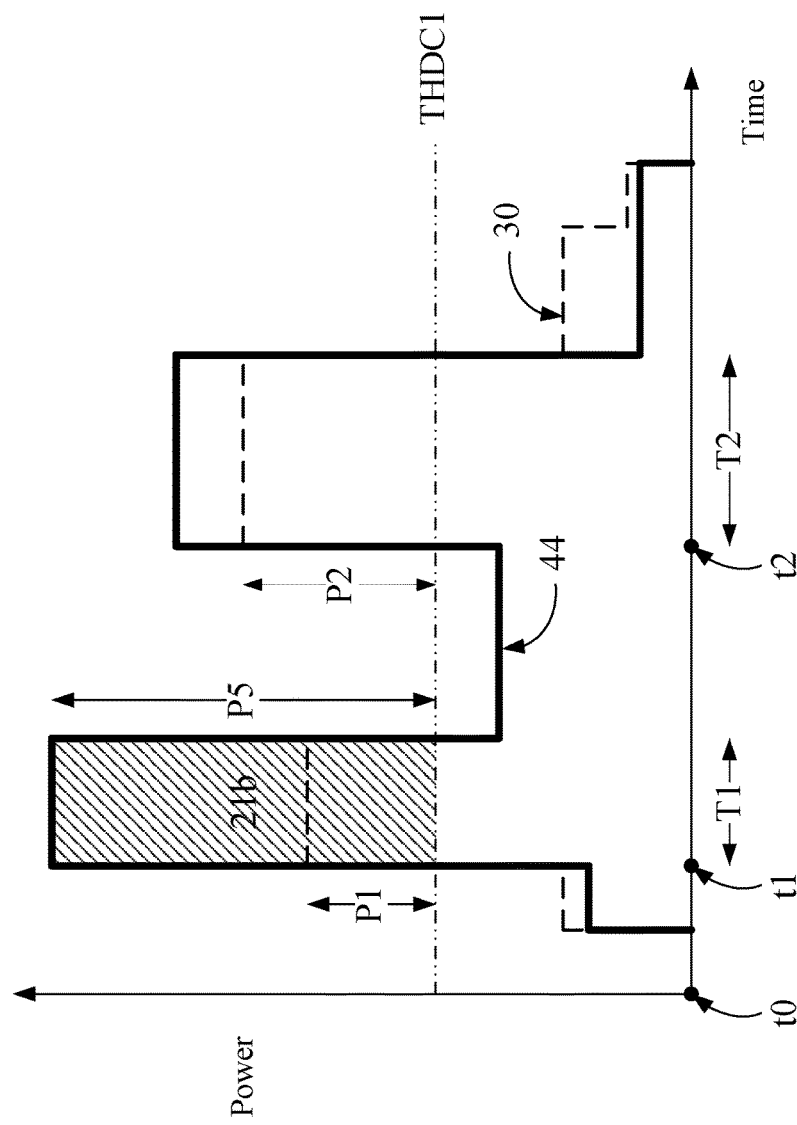
FIG. 1K is another schematic view depicting how the charge and discharge control apparatus 11 decides the electricity to be released by the storage battery 15.

Please refer to FIG. 1B, FIG. 1C, FIG. 1K, FIG. 1L, and FIG. 1M for the fourth kind of situation. FIG. 1K is another schematic view depicting how the processing unit 115 of the charge and discharge control apparatus 11 decides the electricity to be released by the storage battery 15 according to the load power of the electric loop 13 during the real electricity dispatching period, wherein the horizontal axis represents the time and the vertical axis represents the load power. In FIG. 1K, a real load curve 44 represents the real load power of the electric loop 13 at each of the dispatching time points. The communication interface 111 receives a load parameter of the electric loop 13 at the dispatching time point t1, wherein the load parameter carries a load power of the electric loop 13 at the dispatching time point t1. Next, the processing unit 115 determines that the load power corresponding to the dispatching time point t1 (which may be called a fourth specific time point so as to be distinguished from other dispatching time points) is greater than the dispatching threshold THDC1 and greater than a sum of the predetermined discharge power P1 corresponding to the dispatching time point t1 (i.e., the fourth specific time point) and the dispatching threshold THDC1.

Based on the aforesaid determination result, the processing unit 115 takes the load power corresponding to the dispatching time point t1 (i.e., the fourth specific time point) minus the dispatching threshold THDC1 as an evaluated discharge power P5 and calculates an evaluated discharge amount 21b according to the evaluated discharge power P5 and the dispatching period T1 corresponding to the dispatching time point t1 (i.e., the fourth specific time point). The processing unit 115 determines that the evaluated discharge amount 21b is greater than a sum of the backup electricity amount B1 and the predetermined discharge amount 21a corresponding to the dispatching time point t1 (i.e., the fourth specific time point) (see FIG. 1C and FIG. 1K). Since the evaluated discharge amount 21b is greater than the sum of the backup electricity amount B1 and the predetermined discharge amount 21a, the processing unit 115 further increases the dispatching threshold THDC1 previously used (e.g., uses the dispatching threshold THDC2 depicted in FIG. 1L instead).

Figure 1M:
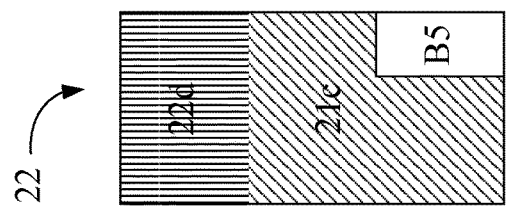
FIG. 1M is a schematic view depicting an updated predetermined discharge amount 21c, predetermined discharge amount 22d, and a backup electricity amount B5.
Figure 1L:
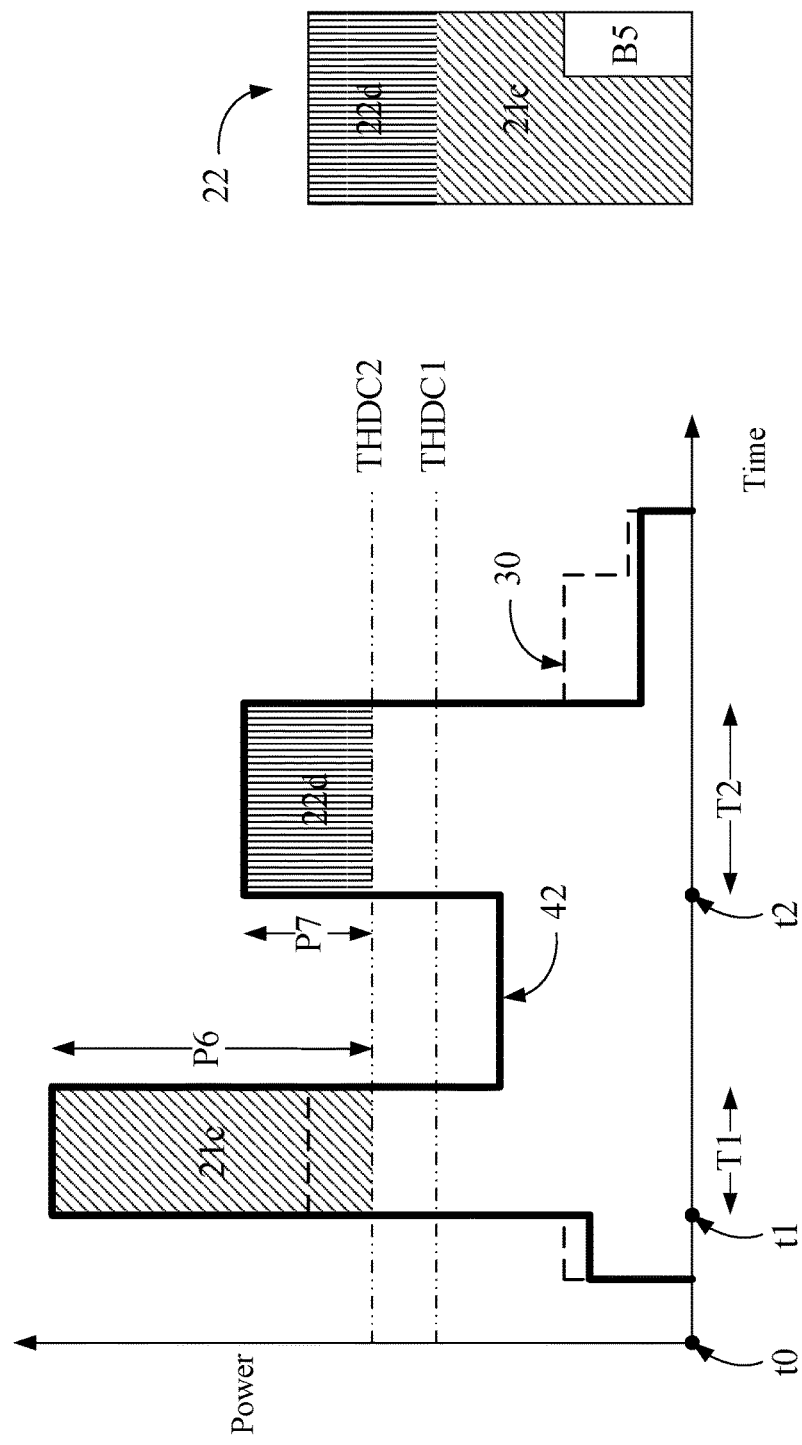
FIG. 1L is a schematic view depicting the increase of the dispatching threshold.

Next, the processing unit 115 obtains the current stored electricity amount 22 of the storage battery 15. In some embodiments, the processing unit 15 obtains the current stored electricity amount 22 of the storage battery 15 by calculating a sum of the backup electricity amount B1, the predetermined discharge amount 21a corresponding to the dispatching time point t1, and the predetermined discharge amount 22a corresponding to the dispatching time point t2. In some embodiments, the processing unit 115 may query the current stored electricity amount 22 of the storage battery 15 via the communication interface 113 (e.g., transmit a request signal via the communication interface 113) and then receive a stored electricity parameter carrying the current storage electricity 22 of the storage battery 15 via the communication interface 113. Next, the processing unit 115 updates the predetermined discharge amounts and the plurality of predetermined discharge power of the dispatching time point t1 (i.e., the fourth specific time point) and the dispatching time points coming after the dispatching time point t1 (i.e., the fourth specific time point) according to the stored electricity amount 22 and the dispatching threshold THDC2. As shown in FIG. 1L and FIG. 1M, after the update, the dispatching time point t1 (i.e., the fourth specific time point) corresponds to a predetermined discharge amount 21c and a predetermined discharge power P6 and the dispatching time point t2 corresponds to a predetermined discharge amount 22d and a predetermined discharge power P7. Thereafter, the processing unit 115 decides the real discharge power corresponding to the dispatching time point t1 (i.e., the fourth specific time point) to be the updated predetermined discharge power P6. In addition, the processing unit 115 updates the backup electricity amount B1 to be a backup electricity amount B5 according to the updated predetermined discharge amount 21c and 22d.

It shall be appreciated that when the dispatching threshold THDC1 needs to be increased in the aforesaid fourth situation, the processing unit 115 of the charge and discharge control apparatus 11 may arbitrarily increase the dispatching threshold THDC1 in some embodiments. In some other embodiments, when the processing unit 115 increases the dispatching threshold, the increased dispatching threshold has to satisfy the following conditions: (i) a sum of the plurality of the updated predetermined discharge amounts and the backup electricity amount is not greater than the current stored electricity amount 22 of the storage battery 15 (e.g., in FIG. 1L and FIG. 1M, the sum of the predetermined discharge amount 21c, the predetermined discharge amount 22d, and the backup electricity amount B5 is not greater than the stored electricity amount 22) and (ii) each updated predetermined discharge power is not greater than the maximum discharge power of the storage battery 15. In some embodiments, the value of the backup electricity amount B5 may be decreased as much as possible (e.g., be set to be zero) so as to decrease the dispatching threshold THDC2 as much as possible.

In some embodiments, the charge and discharge control apparatus 11 further has a mechanism for releasing the backup electricity amount. Specifically, the processing unit 115 periodically or aperiodically calculates the current stored electricity amount of the storage battery 15 during the peak electricity price period, calculates a release time needed to release the stored electricity amount at a maximum discharge power of the storage battery 15, and calculates a remaining time from a current time point to an ending time point of a peak electricity price period. If the remaining time is not longer than the release time, the communication interface 113 transmits an instruction message for instructing the storage battery 15 to discharge at the maximum discharge power. Through the aforesaid operation, the charge and discharge control apparatus 11 can ensure that the stored electricity amount of the storage battery 15 is completely released before the end of the peak electricity price period. In this way, a higher economic benefit through the difference in electricity price between the peak period and the off-peak period can be achieved.

According to the above descriptions, the charge and discharge control apparatus 11 can control the storage battery 15 to be charged by the power supply system 17 of the electric power company during a period where the electricity price is relatively low (e.g., during the off-peak electricity price period) and decide the real discharge power that the storage battery 15 provides to the electric loop 13 at least according to the load power of the electric loop 13 during a period where the electricity price is relatively high (e.g., during the peak electricity price period). Since the charge and discharge control apparatus 11 adjusts the real discharge power that the storage battery 15 provides to the electric loop 13 according to the real load power of the electric loop 13 during the real electricity dispatching period, the electricity consumption peak during the real electricity dispatching period can be shaved accurately and, thereby, reducing the demand charge. Moreover, the charge and discharge control apparatus 11 enables the storage battery 15 to be charged during the period where the electricity price is relatively low and enables the storage battery 15 to discharge during the period where the electricity price is relatively high and, thereby, acquiring a higher economic benefit through the difference in electricity price between the peak period and the off-peak period.

Figure 2A:
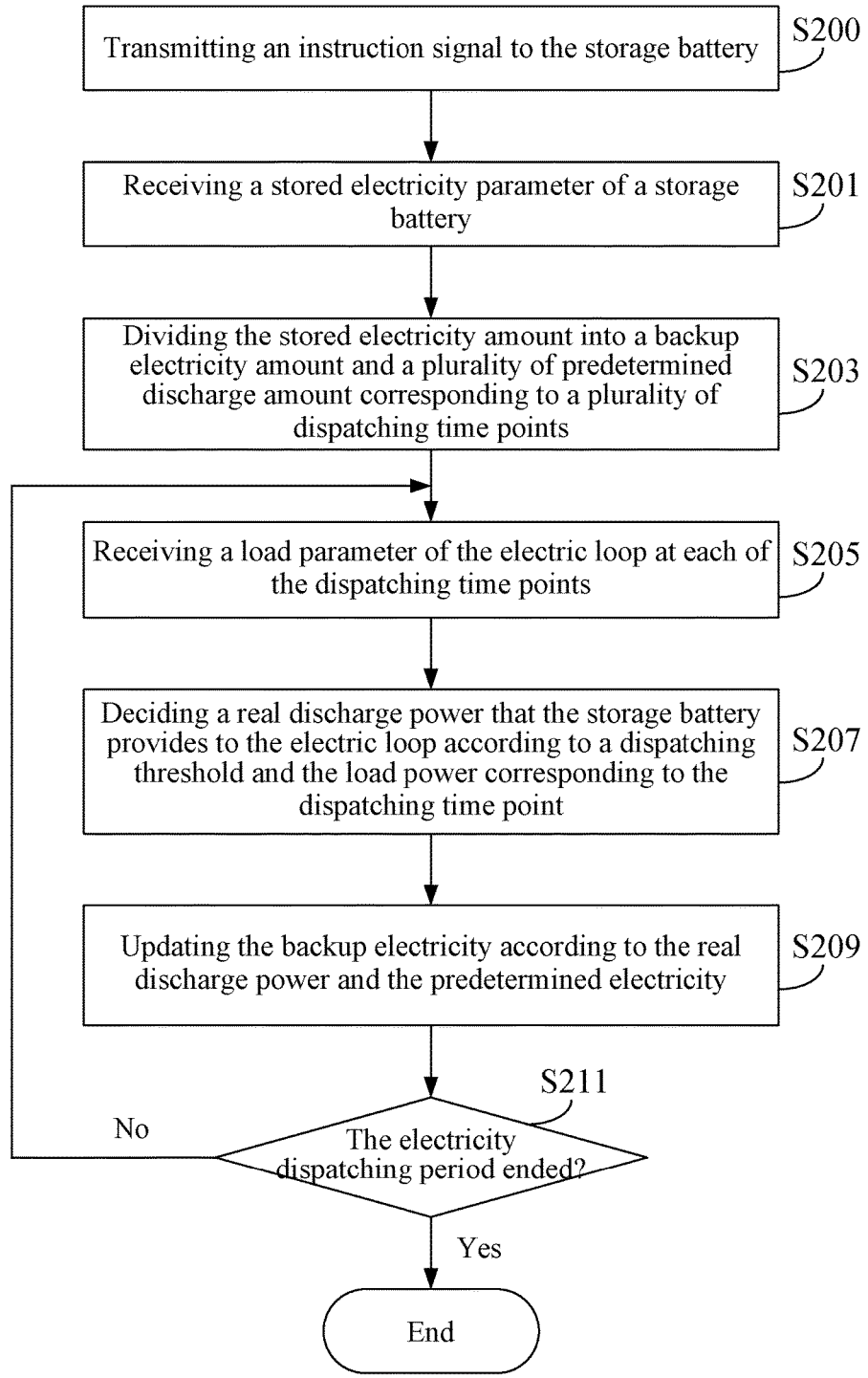
FIG. 2A is a flowchart depicting a charge and discharge control method according to a second embodiment of the present invention.

A second embodiment of the present invention is a charge and discharge control method, wherein a flowchart diagram of which is depicted in FIG. 2A. The charge and discharge control method is for use in an electronic computing apparatus (e.g., the charge and discharge control apparatus 11 of the first embodiment). The electronic computing apparatus is electrically connected to a storage battery and an electric loop. Both the storage battery and a power supply system of an electric power company are connected to the electric loop and both of them can provide electricity to the electric loop. The storage battery is connected to the power supply system of the electric power company. The operation flow of the charge and discharge control method will be detailed hereinafter.

First, step S200 is executed to enable the electronic computing apparatus to transmit an instruction signal to the storage battery (e.g., during an off-peak electricity price period or during a period where the power consumption is relatively small) so that the storage battery switches to the charge mode to be charged by the power supply system of the electric power company. It shall be appreciated that the number of times that the step S200 is executed is not limited in this embodiment. Before the real electricity dispatching period, the charge and discharge control method executes steps S201 and S203. In the step S201, a stored electricity parameter of a storage battery is received by the electronic computing apparatus, wherein the stored electricity parameter carries a stored electricity amount (in unit of kWh) of the storage battery. Next, in the step S203, the stored electricity amount is divided into a backup electricity amount and a plurality of predetermined discharge amount corresponding to a plurality of dispatching time points by the electronic computing apparatus, wherein each of the dispatching time points corresponds to a dispatching period and a predetermined discharge power (in unit of kW). In some embodiments, each of the predetermined discharge power is not greater than a maximum discharge power of the storage battery.

It shall be appreciated that, in some embodiments, the charge and discharge control method may execute another step (not shown) to decide a predicted load power of each of the dispatching time points according to historical load data by the electronic computing apparatus and another step (not shown) to decide the plurality of predetermined discharge power used in the step S203 according to the plurality of predicted load power and a schedule threshold by the electronic computing apparatus. Additionally, in some embodiments, the charge and discharge control method may execute the following steps to decide the schedule threshold. Specifically, the charge and discharge control method may execute a step (not shown) to calculate a peak shaving limit that satisfies: (i) each of the predicted load power minus the peak shaving limit is not greater than a maximum discharge power of the storage battery and (ii) an evaluated discharge amount decided according to the peak shaving limit and the plurality of predicted load power is not greater than the stored electricity amount. In some embodiments, the charge and discharge control method may select the greatest one of the peak shaving limit, a contracted capacity signed by the user of the electric loop with the electric power company, and a maximum demand of a past specific period (e.g., this billing month) as the schedule threshold. In some embodiments, the charge and discharge control method may also select one of the three items (i.e. the peak shaving limit, a contracted capacity signed by the user of the electric loop with the electric power company, and a maximum demand of a past specific period) or the greatest one of some of the three items as the schedule threshold.

Thereafter, the charge and discharge control method executes steps S205, S207, S209, and S211 at each of the dispatching time points of the real electricity dispatching period. In the step S205, a load parameter of the electric loop is received by the electronic computing apparatus at each of the dispatching time points, wherein each of the load parameters carries a load power of the electric loop. Next, in the step S207, a real discharge power that the storage battery provides to the electric loop is decided by the electronic computing apparatus at least according to a dispatching threshold and the load power corresponding to the dispatching time point. It shall be appreciated that, in some embodiments, the dispatching threshold may be set to be the same as the schedule threshold by the charge and discharge control method at the beginning of the real electricity dispatching period. Moreover, the charge and discharge control method may further execute a step (not shown) to take the greatest one of the schedule threshold and a maximum demand of a past specific period (e.g., this billing month) as the dispatching threshold. Thereafter, in the step S209, the backup electricity amount is updated by the electronic computing apparatus according to the real discharge power and the predetermined discharge amount. Please note that four kinds of situations may occur during the real electricity dispatching period. In the following descriptions, the specific steps executed by the charge and discharge control method with respect to the four kinds of situations will be elaborated.

Herein, the first kind of situation will be described. In the first kind of situation, the load power corresponding to the dispatching time point in question (which may be called a first specific time point) is smaller than the dispatching threshold. In the first kind of situation, the step S207 is executed to enable the electronic computing apparatus to decide the real discharge power corresponding to the first specific time point to be zero. Moreover, the step S209 is executed to enable the electronic computing apparatus to update the backup electricity amount by adding the predetermined discharge amount corresponding to the first specific time point to the backup electricity amount.

Herein, the second kind of situation will be described. In the second kind of situation, the load power corresponding to the dispatching time point in question (which may be called a second specific time point) is greater than the dispatching threshold and smaller than a sum of the predetermined discharge power corresponding to the second specific time point and the dispatching threshold. In the second kind of situation, the step S207 is executed to enable the electronic computing apparatus to decide the real discharge power corresponding to the second specific time point to be the load power corresponding to the second specific time point minus the dispatching threshold. The step S209 is executed to enable the electronic computing apparatus to decide a real discharge amount according to the real discharge power and the dispatching period corresponding to the second specific time point, and update the backup electricity amount by adding a difference between the predetermined discharge amount corresponding to the second specific time point and the real discharge amount to the backup electricity amount.

Herein, the third kind of situation will be described. In the third kind of situation, the load power corresponding to the dispatching time point in question (which may be called a third specific time point) is greater than the dispatching threshold and greater than a first sum of the predetermined discharge power corresponding to the third specific time point and the dispatching threshold. The charge and discharge control method further enables the electronic computing apparatus to execute a step (not shown) to take the load power corresponding to the third specific time point minus the dispatching threshold as an evaluated discharge power, execute another step (not shown) to calculate an evaluated discharge amount according to the evaluated discharge power and the dispatching period corresponding to the third specific time point, and execute yet another step (not shown) to determine that the evaluated discharge amount is smaller than a second sum of the backup electricity amount and the predetermined discharge amount corresponding to the third specific time point. Moreover, the step 207 is executed to decide the real discharge power corresponding to the third specific time point to be the evaluated discharge power, while the step S209 is executed to update the backup electricity amount by subtracting a difference between the evaluated discharge amount and the predetermined discharge amount corresponding to the third specific time point from the backup electricity amount.

Herein, the fourth kind of situation will be described. In the fourth kind of situation, the load power corresponding to the dispatching time point in question (which may be called a fourth specific time point) is greater than the dispatching threshold and greater than a sum of the predetermined discharge power corresponding to the fourth specific time point and the dispatching threshold. The charge and discharge control method further enables the electronic computing apparatus to execute a step (not shown) to take the load power corresponding to the fourth specific time point minus the dispatching threshold as an evaluated discharge power, execute another step (not shown) to calculate an evaluated discharge amount according to the evaluated discharge power and the dispatching period corresponding to the fourth specific time point, execute another step (not shown) to determine that the evaluated discharge amount is greater than the backup electricity amount, execute another step (not shown) to increase the dispatching threshold, execute another step (not shown) to calculate the stored electricity amount of the storage battery (e.g., by calculating a sum of the backup electricity amount and the predetermined discharge amount corresponding to each of the dispatching time points), and execute yet another step (not shown) to update the predetermined discharge amounts and the plurality of predetermined discharge power of the fourth specific time point and the dispatching time points coming after the fourth specific time point according to the stored electricity amount and the dispatching threshold. It shall be appreciated that, in some embodiments, the charge and discharge control method may execute a step to receive a stored electricity parameter carrying the current stored electricity amount of the storage battery instead of executing the aforesaid step of calculating the stored electricity amount of the storage battery. Additionally, the step S207 is executed to decide the real discharge power corresponding to the fourth specific time point to be the updated predetermined discharge power corresponding to the fourth specific time point, while the step S209 is executed to update the backup electricity amount according to the plurality of updated predetermined discharge amount.

Thereafter, the step S211 is executed by the electronic computing apparatus to determine whether the electricity dispatching period has ended. If the determination result of the step S211 is no, the electronic computing apparatus executes the steps S205, S207, S209, and S211 to deal with the next dispatching time point. If the determination result of the step S211 is yes, the electricity dispatching during the electricity dispatching period is ended.

In some embodiments, the charge and discharge control method may divide a real electricity dispatching period into a plurality of dispatching sub-periods. For example, if the real electricity dispatching period of a day is from 9:00 am to 9:00 pm (12 hours in total), the charge and discharge control method divides the real electricity dispatching period into four dispatching sub-periods and each of the dispatching sub-periods includes 3 hours. In those embodiments, the charge and discharge control method may execute the steps S201 and S203 before the start of each dispatching sub-period. Through the steps S201 and S203, the charge and discharge control method periodically obtains the current stored electricity amount of the storage battery and periodically rearranges the predetermined discharge amount of each of the dispatching time points. Therefore, during each dispatching sub-period, the charge and discharge control method can obtain a better dispatching effect by performing dispatching control with the updated information.

Figure 2B:
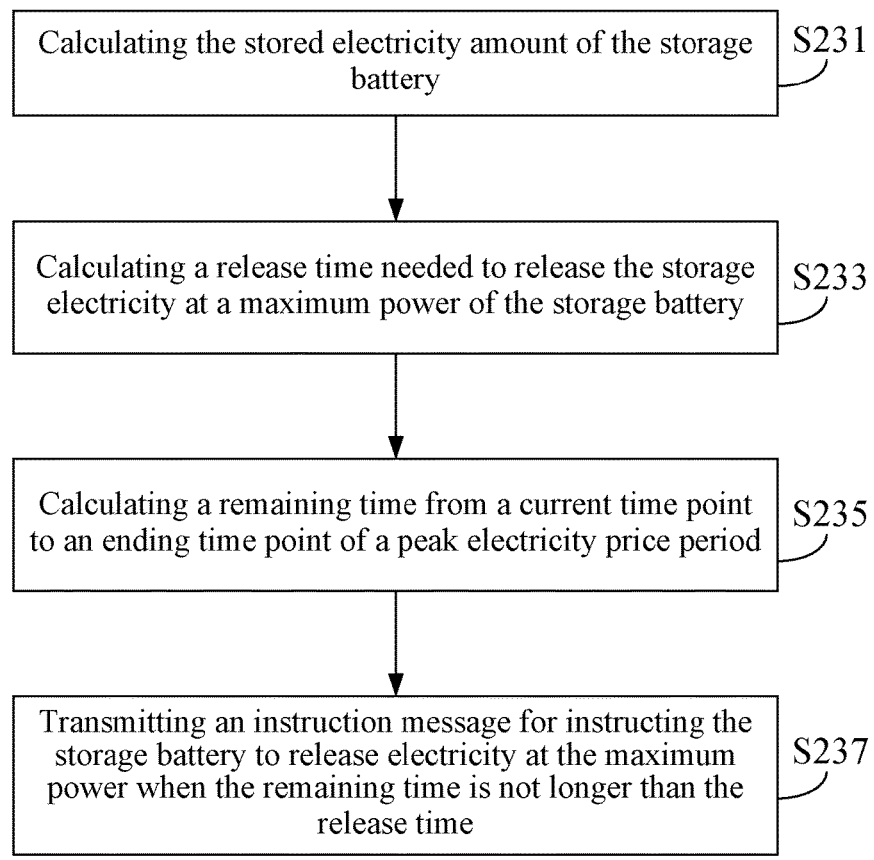
FIG. 2B is a flowchart depicting a mechanism for releasing the backup electricity amount.

In some embodiments, the charge and discharge control method further provides a mechanism for releasing the backup electricity amount and a flowchart of which is illustrated in FIG. 2B. In step S231, the stored electricity amount of the storage battery is calculated by the electronic computing apparatus. Then, in step S233, a release time needed to release the stored electricity amount at a maximum discharge power of the storage battery is calculated by the electronic computing apparatus. In step S235, a remaining time from a current time point to an ending time point of a peak electricity price period is calculated by the electronic computing apparatus. Thereafter, in step S237, an instruction message is transmitted by the electronic computing apparatus for instructing the storage battery to discharge at the maximum discharge power when the remaining time is not longer than the release time.

In addition to the aforesaid steps, the second embodiment can also execute all the operations and steps of the charge and discharge control apparatus 11 set forth in the first embodiment, have the same functions, and deliver the same technical effects as the first embodiment. How the second embodiment executes these operations and steps, have the same functions, and deliver the same technical effects as the first embodiment will be readily appreciated by those of ordinary skill in the art based on the explanation of the first embodiment and, thus, will not be further described herein.

It shall be appreciated that, in the specification of the present invention, the terms "first," "second," "third," and "fourth" used in the first specific time point, the second specific time point, the third specific time point, and the fourth specific time point are only intended to distinguish these specific time points from each other. Additionally, the terms "first" and "second" used in the first sum and the second sum are only intended to distinguish the sums from each other.

According to the above descriptions, the charge and discharge control technology provided in the present invention can control a storage battery to be charged by a power supply system of an electric power company during a period where the electricity price is relatively low (e.g., during the off-peak electricity price period) and control the storage battery to release electricity to an electric loop at appropriate time during the real electricity dispatching period. Before the real electricity dispatching period, the charge and discharge control technology of the present invention divides the stored electricity amount of the storage battery into a backup electricity amount and a plurality of predetermined discharge amounts corresponding to a plurality of dispatching time points. During the real electricity dispatching period, the present invention decides a real discharge power that the storage battery provides to the electric loop according to a dispatching threshold and the real load power of the electric loop and updates the backup electricity amount according to the real discharge power and the predetermined discharge amount(s). Since the charge and discharge control technology of the present invention adjusts the real discharge power that the storage battery provides to the electric loop according to the real load power of the electric loop during the real electricity dispatching period, the electricity consumption peak during the real electricity dispatching period can be shaved accurately and, thereby, reducing the demand charge. Moreover, the charge and discharge control technology of the present invention charges the storage battery during the period where the electricity price is relatively low and enables the storage battery to release electricity during the period where the electricity price is relatively high and, thereby, acquiring a higher economic benefit through the difference in electricity price between the peak period and the off-peak period.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A charge and discharge control apparatus, comprising:
   a first communication interface, being configured to receive a stored electricity parameter of a storage battery, the stored electricity parameter carrying a stored electricity amount of the storage battery;
   a processing unit, being electrically connected to the first communication interface and configured to divide the stored electricity amount into a backup electricity amount and a plurality of predetermined discharge amount corresponding to a plurality of dispatching time points, each of the dispatching time points corresponding to a dispatching period and a predetermined discharge power; and
   a second communication interface, being electrically connected to the processing unit and an electric loop and configured to receive a load parameter of the electric loop at each of the dispatching time points, each of the load parameters carrying a load power of the electric loop;
   wherein the processing unit further performs the following operations at each of the dispatching time points: deciding a real discharge power that the storage battery provides to the electric loop according to a dispatching threshold and the load power corresponding to the dispatching time point and updating the backup electricity amount according to the real discharge power and the predetermined discharge amount.

2. The charge and discharge control apparatus of claim 1, wherein the load power corresponding to a specific time point among the dispatching time points is smaller than the dispatching threshold, the processing unit decides the real discharge power corresponding to the specific time point to be zero, and the processing unit updates the backup electricity amount by adding the predetermined discharge amount corresponding to the specific time point to the backup electricity amount.

3. The charge and discharge control apparatus of claim 1, wherein the load power corresponding to a specific time point among the dispatching time points is greater than the dispatching threshold and smaller than a sum of the predetermined discharge power corresponding to the specific time point and the dispatching threshold, the processing unit decides the real discharge power corresponding to the specific time point to be the load power corresponding to the specific time point minus the dispatching threshold, the processing unit further decides a real discharge amount according to the real discharge power and the dispatching period corresponding to the specific time point, and the processing unit updates the backup electricity amount by adding a difference between the predetermined discharge amount corresponding to the specific time point and the real discharge amount to the backup electricity amount.

4. The charge and discharge control apparatus of claim 1, wherein the load power corresponding to a specific time point among the dispatching time points is greater than the dispatching threshold and greater than a first sum of the predetermined discharge power corresponding to the specific time point and the dispatching threshold, the processing unit further takes the load power corresponding to the specific time point minus the dispatching threshold as an evaluated discharge power, the processing unit further calculates an evaluated discharge amount according to the evaluated discharge power and the dispatching period corresponding to the specific time point, the processing unit further determines that the evaluated discharge amount is smaller than a second sum of the backup electricity amount and the predetermined discharge amount corresponding to the specific time point, the processing unit decides the real discharge power corresponding to the specific time point to be the evaluated discharge power, and the processing unit updates the backup electricity amount by subtracting a difference between the evaluated discharge amount and the predetermined discharge amount corresponding to the specific time point from the backup electricity amount.

5. The charge and discharge control apparatus of claim 1, wherein the load power corresponding to a specific time point among the dispatching time points is greater than the dispatching threshold and greater than a sum of the predetermined discharge power corresponding to the specific time point and the dispatching threshold, the processing unit further takes the load power corresponding to the specific time point minus the dispatching threshold as an evaluated discharge power, the processing unit further calculates an evaluated discharge amount according to the evaluated discharge power and the dispatching period corresponding to the specific time point, the processing unit further determines that the evaluated discharge amount is greater than the backup electricity amount, the processing unit further increases the dispatching threshold, the processing unit further calculates the stored electricity amount of the storage battery, the processing unit further updates the predetermined discharge amounts and the plurality of predetermined discharge power of the specific time point and the dispatching time points coming after the specific time point according to the stored electricity amount and the dispatching threshold, the processing unit decides the real discharge power corresponding to the specific time point to be the updated predetermined discharge power corresponding to the specific time point, and the processing unit updates the backup electricity amount according to the updated predetermined discharge amounts.

6. The charge and discharge control apparatus of claim 1, wherein each of the predetermined discharge power is not greater than a maximum discharge power of the storage battery.

7. The charge and discharge control apparatus of claim 1, wherein the processing unit further decides a predicted load power of each of the dispatching time points according to historical load data and the processing unit further decides the plurality of predetermined discharge power according to the plurality of predicted load power and a schedule threshold.

8. The charge and discharge control apparatus of claim 7, wherein the processing unit further calculates a peak shaving limit and the peak shaving limit satisfies: (a) each of the predicted load power minus the peak shaving limit is not greater than a maximum discharge power of the storage battery, and (b) an evaluated discharge amount decided according to the peak shaving limit and the plurality of predicted load power is not greater than the stored electricity amount, wherein the schedule threshold is the greatest one of the peak shaving limit, a contracted capacity, and a maximum demand of a specific period.

9. The charge and discharge control apparatus of claim 1, wherein the processing unit further decides the dispatching threshold according to the schedule threshold and a maximum demand of a specific period.

10. The charge and discharge control apparatus of claim 1, wherein the processing unit further calculates the stored electricity amount of the storage battery, calculates a release time needed to release the stored electricity amount at a maximum discharge power of the storage battery, and calculates a remaining time from a current time point to an ending time point of a peak electricity price period, and wherein the first communication interface transmits an instruction message for instructing the storage battery to discharge at the maximum discharge power when the remaining time is not longer than the release time.

11. A charge and discharge control method for an electronic computing apparatus, the electronic computing apparatus being adapted to control a storage battery and connected to an electric loop, the electronic computing apparatus comprising a first communication interface, a processing unit, and a second communication interface, the processing unit being electrically connected to the first communication interface and the second communication interface, the charge and discharge control method comprising:

(a) receiving, by the first communication interface, a stored electricity parameter of a storage battery, wherein the stored electricity parameter carries a stored electricity amount of the storage battery;

(b) dividing, by the processing unit, the stored electricity amount into a backup electricity amount and a plurality of predetermined discharge amount corresponding to a plurality of dispatching time points, each of the dispatching time points corresponding to a dispatching period and a predetermined discharge power;

(c) receiving, by the second communication interface, a load parameter of the electric loop at each of the dispatching time points, wherein each of the load parameters carries a load power of the electric loop; and (d) executing, by the processing unit, the following steps at each of the dispatching time points:
(d1) deciding, by the processing unit, a real discharge power that the storage battery provides to the electric loop according to a dispatching threshold and the load power corresponding to the dispatching time point; and
(d2) updating, by the processing unit, the backup electricity amount according to the real discharge power and the predetermined discharge amount.

12. The charge and discharge control method of claim 11, wherein the load power corresponding to a specific time point among the dispatching time points is smaller than the dispatching threshold, the step (d1) decides the real discharge power corresponding to the specific time point to be zero, and the step (d2) updates the backup electricity amount by adding the predetermined discharge amount corresponding to the specific time point to the backup electricity amount.

13. The charge and discharge control method of claim 11, wherein the load power corresponding to a specific time point among the dispatching time points is greater than the dispatching threshold and smaller than a sum of the predetermined discharge power corresponding to the specific time point and the dispatching threshold, the step (d1) decides the real discharge power corresponding to the specific time point to be the load power corresponding to the specific time point minus the dispatching threshold, and the step (d2) decides a real discharge amount according to the real discharge power and the dispatching period corresponding to the specific time point and updates the backup electricity amount by adding a difference between the predetermined discharge amount corresponding to the specific time point and the real discharge amount to the backup electricity amount.

14. The charge and discharge control method of claim 11, wherein the load power corresponding to a specific time point among the dispatching time points is greater than the dispatching threshold and greater than a first sum of the predetermined discharge power corresponding to the specific time point and the dispatching threshold, the charge and discharge control method further comprises:

taking, by the processing unit, the load power corresponding to the specific time point minus the dispatching threshold as an evaluated discharge power;

calculating, by the processing unit, an evaluated discharge amount according to the evaluated discharge power and the dispatching period corresponding to the specific time point; and determining, by the processing unit, that the evaluated discharge amount is smaller than a second sum of the backup electricity amount and the predetermined discharge amount corresponding to the specific time point;

wherein the step (d1) decides the real discharge power corresponding to the specific time point to be the evaluated discharge power and the step (d2) updates the backup electricity amount by subtracting a difference between the evaluated discharge amount and the predetermined discharge amount corresponding to the specific time point from the backup electricity amount.

15. The charge and discharge control method of claim 11, wherein the load power corresponding to a specific time point among the dispatching time points is greater than the dispatching threshold and greater than a sum of the predetermined discharge power corresponding to the specific time point and the dispatching threshold, the charge and discharge control method further comprises:

taking, by the processing unit, the load power corresponding to the specific time point minus the dispatching threshold as an evaluated discharge power;

calculating, by the processing unit, an evaluated discharge amount according to the evaluated discharge power and the dispatching period corresponding to the specific time point;

determining, by the processing unit, that the evaluated discharge amount is greater than the backup electricity amount;

increasing, by the processing unit, the dispatching threshold;

calculating, by the processing unit, the stored electricity amount of the storage battery; and updating, by the processing unit, the predetermined discharge amounts and the plurality of predetermined discharge power of the specific time point and the dispatching time points coming after the specific time point according to the stored electricity amount and the dispatching threshold;

wherein the step (d1) decides the real discharge power corresponding to the specific time point to be the updated predetermined discharge power corresponding to the specific time point and the step (d2) updates the backup electricity amount according to the plurality of updated predetermined discharge amount.

16. The charge and discharge control method of claim 11, wherein each of the predetermined discharge power is not greater than a maximum discharge power of the storage battery.

17. The charge and discharge control method of claim 11, further comprising:

deciding, by the processing unit, a predicted load power of each of the dispatching time points according to historical load data; and deciding, by the processing unit, the plurality of predetermined discharge power according to the plurality of predicted load power and a schedule threshold.

18. The charge and discharge control method of claim 17, further comprising:

calculating, by the processing unit, a peak shaving limit, wherein the peak shaving limit satisfies: (a) each of the predicted load power minus the peak shaving limit is not greater than a maximum discharge power of the storage battery and (b) an evaluated discharge amount decided according to the peak shaving limit and the plurality of predicted load power is not greater than the stored electricity amount, wherein the schedule threshold is the greatest one of the peak shaving limit, a contracted capacity, and a maximum demand of a specific period.

19. The charge and discharge control method of claim 11, further comprising:

deciding, by the processing unit, the dispatching threshold according to the schedule threshold and a maximum demand of a specific period.

20. The charge and discharge control method of claim 11, further comprising:

calculating, by the processing unit, the stored electricity amount of the storage battery;

calculating, by the processing unit, a release time needed to release the stored electricity amount at a maximum discharge power of the storage battery;

calculating, by the processing unit, a remaining time from a current time point to an ending time point of a peak electricity price period; and transmitting, by the processing unit, an instruction message for instructing the storage battery to discharge at the maximum discharge power when the remaining time is not longer than the release time.

* * * * *